United States Patent [19]

Kearney

[11] 4,055,196

[45] Oct. 25, 1977

[54] IMMERSION TYPE METAL DEGREASER WITH COMPRESSION-EXPANSION SYSTEM FOR HEATING AND COOLING OF LIQUID SOLVENT AND SOLVENT VAPORS

[75] Inventor: Thomas J. Kearney, Detroit, Mich.

[73] Assignee: Detrex Chemical Industries, Inc., Detroit, Mich.

[21] Appl. No.: 669,271

[22] Filed: Mar. 22, 1976

Related U.S. Application Data

[63] Continuation-in-part of Ser. No. 522,609, Nov. 11, 1974, abandoned.

[51] Int. Cl.$^2$ ............................................. B08B 7/04
[52] U.S. Cl. .................................. 134/107; 202/169; 159/24 A; 134/109
[58] Field of Search ............ 202/168, 169; 159/24 A; 134/10–12, 107, 109

[56] References Cited

U.S. PATENT DOCUMENTS

| | | | |
|---|---|---|---|
| 1,465,020 | 8/1923 | Monti | 159/24 A |
| 1,911,926 | 5/1933 | Robertson | 202/169 |
| 2,527,349 | 10/1950 | Black | 202/170 |
| 2,816,065 | 12/1957 | Legler | 202/168 |
| 2,842,143 | 7/1958 | Kearney | 202/170 |
| 3,070,463 | 12/1962 | Barday | 202/170 |
| 3,091,098 | 5/1963 | Bowers | 159/24 A |
| 3,375,177 | 3/1968 | Rand | 202/170 |

Primary Examiner—Hiram H. Bernstein
Attorney, Agent, or Firm—Paul & Paul

[57] ABSTRACT

An immersion type metal degreaser for use with relatively low boiling fluorocarbon solvents or azeotropes thereof in which liquid solvent is boiled and vaporized in the degreaser by a heater immersed in liquid solvent which constitutes the condenser section of a compression-expansion refrigeration system and in which solvent vapors within the metal degreaser are confined within the degreaser by being cooled and condensed by means constituting the evaporator section of the refrigeration system. An adjunct of the cooling system maintains a portion of the liquid solvent within which ultrasonic units are immersed at the optimum temperature thereof.

5 Claims, 3 Drawing Figures

4,055,196

IMMERSION TYPE METAL DEGREASER WITH COMPRESSION-EXPANSION SYSTEM FOR HEATING AND COOLING OF LIQUID SOLVENT AND SOLVENT VAPORS

CROSS-REFERENCE TO RELATED APPLICATION

This is a continuation-in-part of my pending application, Ser. No. 522,609 filed Nov. 11, 1974, and now abandoned.

BACKGROUND OF THE INVENTION

For many years the most frequently used apparatus for cleaning metal objects and the like has consisted of degreasers operating with a heated stabilized chlorinated hydrocarbon, such as trichloroethylene or perchloroethylene, as the degreasing solvent. Such solvents boil at relatively high temperatures (188.6° F. for trichloroethylene and 236° F. for perchloroethylene) and, since one of the metal cleaning operations involves passage of the work through solvent vapors, there have been problems in some cases preventing the escape of toxic vapors to the atmosphere.

In the present invention, a low boiling solvent such as methylene chloride, trichlorotrifluoroethane, or azeotropes thereof, is employed as the degreasing solvent. These solvents boil at temperatures substantially lower than the boiling points of trichloroethylene or perchloroethylene. For example, methylene chloride boils at 103.6° F., trichlorotrifluoroethane boils at 117.6° F., and its azeotrope with methylene chloride boils at 97.2° F. As used in the present application the term "low boiling solvent" refers to a metal degreasing solvent which boils in the range from about 97° to about 120° F. at normal atmospheric pressure.

In the operation of metal degreasing apparatus, maintenance of a solvent-vapor system is required so that a portion of the liquid solvent is continuously boiled in a boil chamber, thereby producing a vapor level overlying the liquid solvent. The vapor level is normally controlled by drawing off any vapors above the predetermined level and causing them to be condensed to liquid solvent, which may be subsequently recycled. By locating cooling coils in a cooling chamber adjacent to and communicating with the vapor containing space, the condensing action of the cooling coils is sufficient to draw off vapors above the vapor level.

Metal degreasing apparatus of the prior art has provided such a solvent-vapor system by use of heating coils immersed in the boil chamber and cooling coils positioned in the cooling chamber, both of which operate independently of one another and both of which require separate external energy inputs. This arrangement has proven to be both inefficient and wasteful in its use of energy. Furthermore, with the advent of the use of ultrasonic vibrators immersed in a portion of the liquid solvent, it has become necessary to control the temperature of that portion of the solvent to an optimum level for efficient operation of the ultrasonic transducers. This optimum temperature lies within the narrow range of from about 90° to about 100° F. This ultrasonic bath temperature control has required yet another external energy input and this further impairs efficiency.

While this inefficient and wasteful use of energy has been recognized by those skilled in the art, little, if any, improvement in efficiency has been made until that provided by the present invention.

SUMMARY OF THE INVENTION

One of the principal objects of the present invention is to provide an immersion type metal degreaser in which a relatively low boiling liquid solvent-vapor system can be maintained with a minimal requirement for input of external energy. In accordance with the present invention, this object is accomplished by providing metal degreasing apparatus, as well as a method for degreasing metal objects, wherein a compression-expansion type refrigeration system is utilized in balanced heat transfer relationship with the solvent-vapor system to provide all of the heat transfer requirements thereof, both as to heating and cooling. Accordingly, the only external source of energy required to maintain the solvent-vapor system of the present invention is that which powers the refrigeration system.

More specifically, the liquid solvent is continuously boiled and vaporized through the action of a heater immersed in the liquid solvent where the immersed heater is the condenser section of a refrigeration system and the solvent vapor is continuously cooled and condensed by the evaporator section of the same refrigeration system. For purposes of the present invention, it is to be understood that the terms "condenser" and "heating coil" may be used interchangeably, as may the terms "evaporator" and "cooling coil". The refrigerant is also utilized for maintaining the immersion chamber solvent at an optimum temperature for operation of ultrasonic transducer units positioned therein, and also is available for cooling the degreaser walls at the desired upper vapor level and for maintaining cooling coils at a low temperature.

Thus, the present invention provides all of the above heating and cooling operations with but a single energy input, namely, the electrical energy required to operate a compressor unit in the compression-expansion refrigeration system as hereinafter described.

Figure 1:
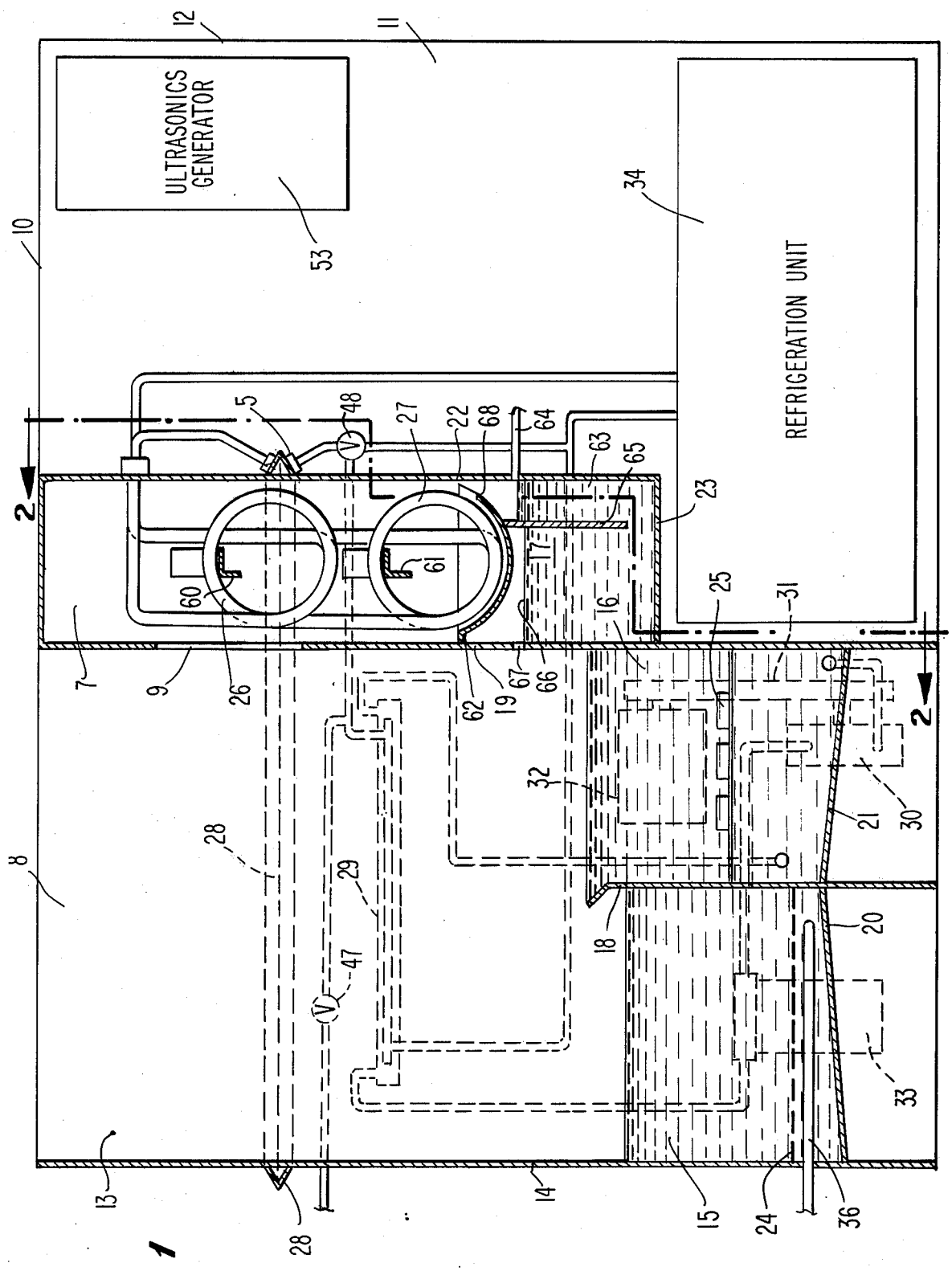
FIG. 1 is a view in front elevation partly in section of a metal degreasing apparatus embodying the present invention.

As shown in the drawings, my improved low temperature solvent metal degreasing apparatus comprises a housing 10 constructed of non-corrosive metal and having flat and continuous side and end walls 11, 12, 13 and 14. The interior of housing 10 is divided into a boil chamber 15 and a rinse chamber 16. Partition 18 rises partway up from the sloped bottom 20 of boil chamber 15 and partition 19 rises from sloped bottom 21 of rinse chamber 16 to the top of housing 10 forming a distillate reservoir 17 with end wall 22 and flat bottom 23. There is thus formed a cooling chamber 7 which opens into freeboard area 8 through opening 9.

Mounted toward the bottom of boil chamber 15 is work rest 24 which acts as a support for work being processed in the liquid cleaning solvent contained in boil chamber 15. Ultrasonic transducers 25 are mounted in rinse chamber 16 at a low level where they will be immersed in the solvent contained in rinse chamber 16.

In cooling chamber 7, cooling coils 26 and 27 are mounted on brackets 60 and 61 so that solvent vapors entering cooling chamber 7 through opening 9 may freely circulate thereabout and be condensed to liquid solvent thereby. Receiving tray 62 is provided in cooling chamber 7 below cooling coils 26 and 27 to collect liquid solvent as it condenses. The collected liquid solvent overflows lip 68 of receiving tray 62 into water separator 63 which is separated from solvent reservoir 17 by baffle 65.

Any water which is present in the collected liquid solvent rises to the surface in water separator 63 where it is removed through drain line 64, while the solvent which passes through water separator 63 flows underneath baffle 65 into distillate reservoir 17. A rectangular opening 67 is provided in partition 19 just above liquid level 66 so that the condensed solvent can overflow into rinse chamber 16 and thereby be recycled.

Figure 2:
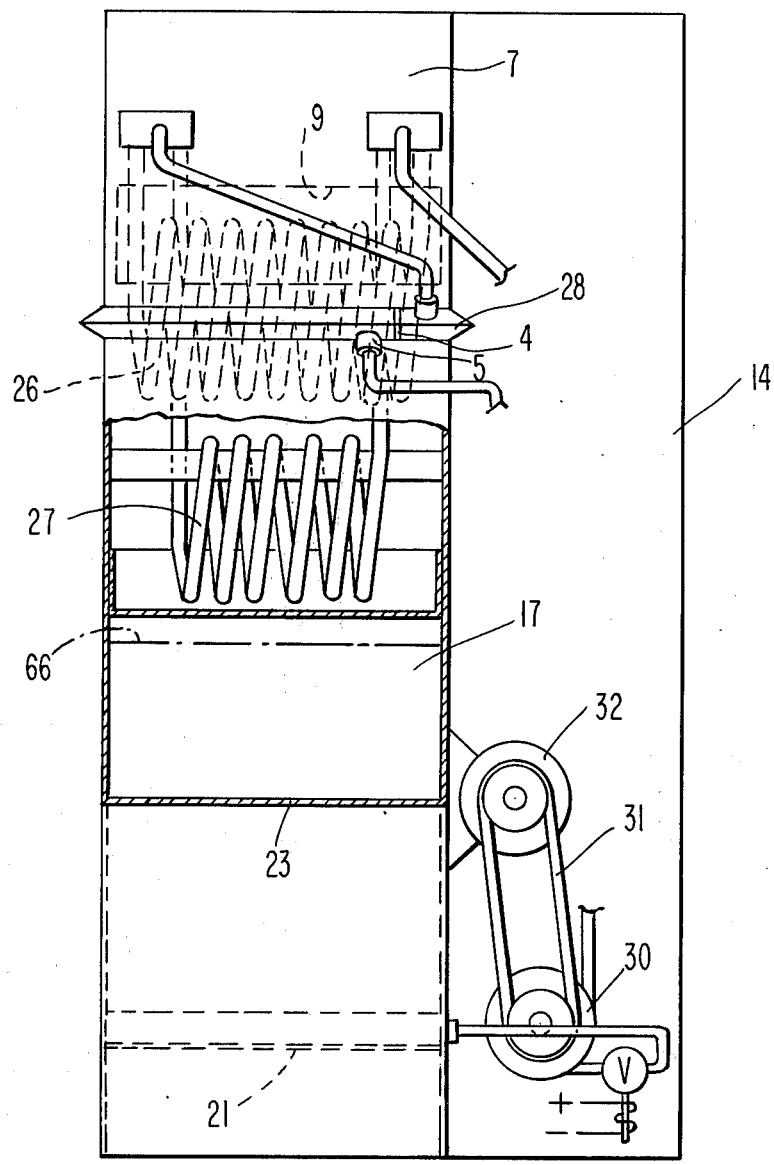
FIG. 2 is an end elevation partly in section taken as indicated by the arrows 2—2 in FIG. 1.

Also shown in FIGS. 1 and 2 are vapor line jacket 28 and heat exchanger 29. The input side of circulating pump 30 is shown connected to a line leading from the rinse chamber 16 and the output side of pump 30 is shown connected to a line connected to filter 33. The outlet of filter 33 is connected to heat exchanger 29 which feeds back to rinse chamber 16. Pump 30 is driven through belt 31 which is operatively connected to member 32 which is driven by an electric motor (not shown). An ultrasonics generator of conventional type is shown at 53 and the refrigeration units hereinafter described are positioned at 34.

Figure 3:
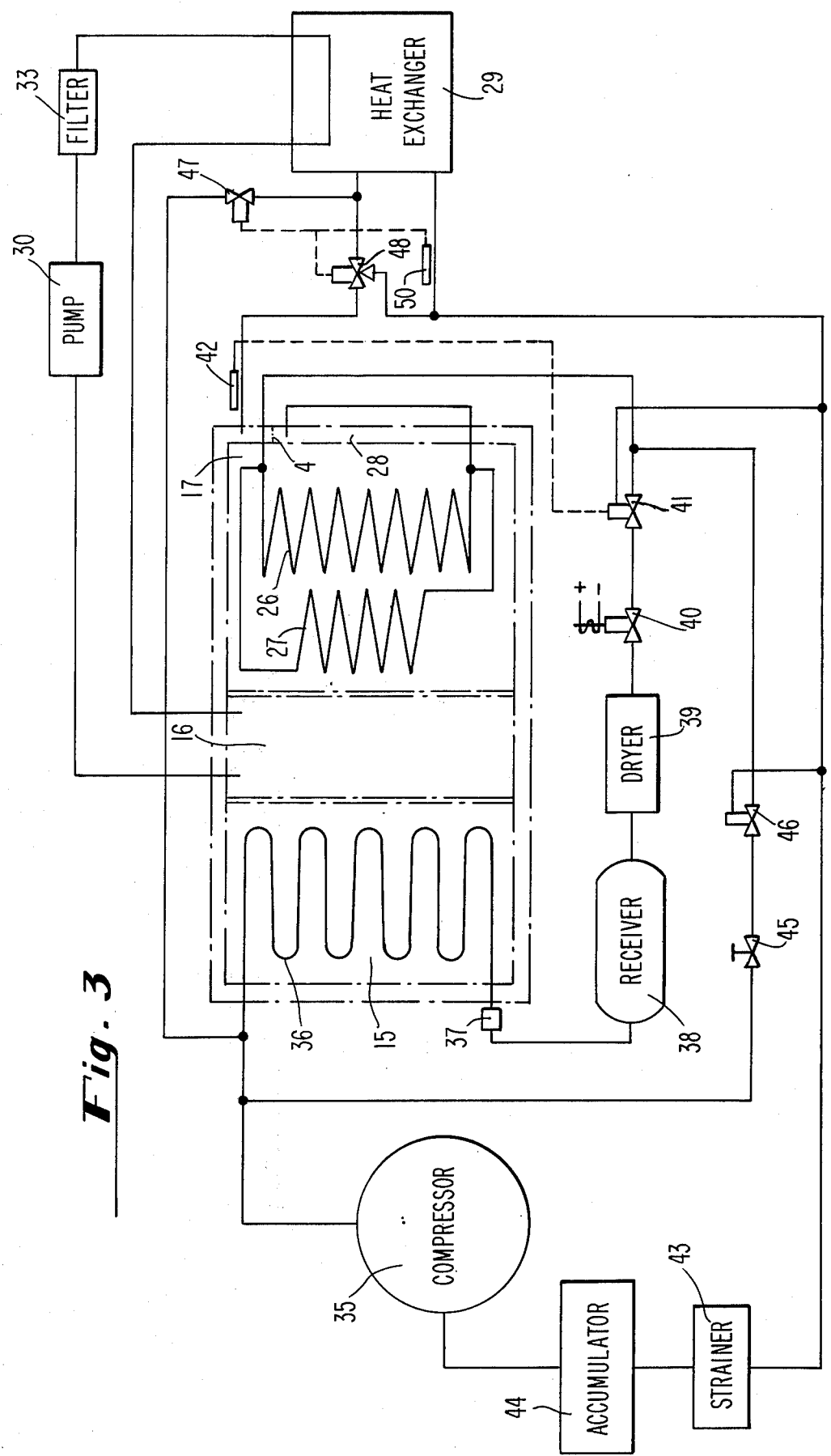
FIG. 3 is a schematic view showing the combination of units comprising the present invention.

FIG. 3 is a schematic drawing showing the refrigeration system and the heating and cooling flow of refrigerant by which the liquid cleaning solvent is heated and by which its vapors are cooled and condensed. Compressor 35 delivers hot refrigerant liquid under relatively high pressure to heating coils 36 mounted in boil chamber 15. A liquid trap is shown at 37 and a refrigerant receiver for the partially cooled refrigerant is shown at 38. The remaining parts of the system of FIG. 3 comprise a dryer 39, liquid line solenoid valve 40, expansion valve 41 and its sensing element 42, cooling coils 26 and 27, vapor line jacket 28, heat exchanger 29, strainer 43 and accumulator 44. Valve 45 is an emergency hand valve and hot gas valve 46 is provided to balance the system. Valves 47 and 48 are hot and cold inlet valves respectively for operation of heat exchanger 29 through which solvent from rinse chamber 16 is circulated after passage through filter 33 by pump 30. Sensing element 50 is provided for operation of these valves to control the temperature of the liquid solvent in rinse chamber 16.

Description of the System and Its Operation

A preferred refrigerant for use in the present invention is dichlorodifluoromethane (Freon 12, a product of E. I. DuPont deNemours). Suitable degreasing solvents comprise methylene chloride, trichlorotrifluoroethane or the azeotrope of these solvents.

It is, however, fully within the purview of the present invention that any refrigerant suitable for use in a compression-expansion refrigeration system operating in the temperature and pressure ranges set forth herein may be used. Likewise, other low-boiling metal degreasing solvents may be used.

With boil chamber 15 and rinse chamber 16 charged with liquid solvent to the levels indicated in FIG. 1 and the refrigerant system charged with a suitable refrigerant, a three-horsepower compressor 35 is energized. This results in the delivery of hot refrigerant vapors to the inlet of the condenser, designated in FIG. 1 as heating coil 36, at about 140° F. to about 200° F. and at a pressure of about 207 p.s.i.g. to about 250 p.s.i.g. Heating coil 36 consists of ½-inch stainless steel pipe extending substantially across the bottom area of boil chamber 15 in a series of convolution. At start-up there is a wide difference between the 140° to 200° F. temperature of the hot refrigerant vapors and the room temperature of the degreasing solvent in boil chamber 15. Consequently, through heat interchange at coil 36 a heating of the solvent and a cooling of the refrigerant vapors takes place and this continues throughout the operation of the metal degreaser with the temperature of the liquid solvent rapidly rising to its boiling point, which is substantially lower than the refrigerant vapor temperature. For example, methylene chloride boils at 103.6° F. which is far below the hot refrigerant temperature. The refrigerant vapor in cooling coil 36 is, therefore, cooled sufficiently to form a liquid at the prevailing pressure, which liquid is collected in receiver 38 and is passed through dryer 39 to remove any moisture. The liquid level of the refrigerant is controlled by solenoid 40, which is operative from the electrical circuit of compressor 35. When compressor 35 is not operating, solenoid 40 closes completely to prevent any backflow of refrigerant into dryer 39.

Expansion valve 41 delivers cooled refrigerant to cooling coils 26 and 27. These coils are postioned in the cooling chamber 7 and through their cooling action cause withdrawal of vapors through opening 9 and thus act to condense solvent vapors entering the freeboard area 8. The condensed solvent is collected in receiving tray 62 and permitted to drain off and pass through water separator 63 and is then delivered into distillate reservoir 17 from which it will overflow through opening 67 in partition 19 into rinse chamber 16. The condensed solvent is ultimately recycled from rinse chamber 16 to the boil chamber 15 through overflow of partition 18 to replenish the supply of liquid solvent depleted by the boiling operation.

After passing through cooling coils 26 and 27, the cool refrigerant is fed to vapor line jacket 28 where it circulates around the external walls to an outlet 5, best shown in FIG. 1. The inlet to jacket 28 is separated from outlet 5 by divider 4. Upon leaving outlet 5, the refrigerant passes through valve 48 from which it is passed, either indirectly through heat exchanger 29 or directly to the refrigeration unit, and specifically to strainer 43 and then into accumulator 44 from which it is ultimately returned to high pressure compressor 35 where the cycle is repeated.

It is important to maintain an optimum solvent temperature of the solvent in the rinse chamber 16 because the ultrasonic units mounted in this chamber operate best at a particular temperature. Control of this solvent temperature is accomplished through operation of heat exchanger 29 through the outer portion of which rinse chamber solvent is circulated by means of pump 30. Sensing element 50 is mounted close to ultrasonic units 25 and is immersed in the solvent of rinse chamber 16. Through valves 47 and 48 either heated or cooled refrigerant, respectively is delivered to the inner portion of heat exchanger 29 in response to the condition of sensing element 50, thereby maintaining the desired solvent temperature by heat interchange with the refrigerant. It should be noted that valve 48 may be provided with backflow restriction means for preventing the backflow of refrigerant through the valve due to excess pressure differential downstream thereof.

Utilizing a three-horsepower compressor operating at a discharge pressure of 207 p.s.i.g. at 140° F., a total of 27,500 B.T.U.'s are available at heating coil 27. Operation at 250 p.s.i.g. provides a refrigerant temperature of about 200° F. and a proportionately higher total B.T.U. capacity. This provides an ample heating range and the associated cooling units provide ample cooling, with sufficient additional capacity available to operate the heat exchanger. Consequently, the refrigeration system provides all the necessary heating and cooling and no other energy inputs, such as steam or electrical heat inputs, are required. This results not only in outstanding energy conservation but also provides an appreciable equipment cost reduction.

The thermal balance achieved between the solvent-vapor system and the refrigeration system of the metal degreasing apparatus of the present invention is of utmost importance in achieving the primary objects and advantages thereof. For purposes of the present invention, it is to be understood that "thermal balance" refers to the balanced heat transfer relationship between the solvent-vapor and the refrigeration portions of the system wherein the thermal exchange achieves a steady state and wherein all of the thermal energy required is provided by thermal exchange with the system. Likewise, all of the thermal energy provided by the refrigeration system is utilized to maintain the solvent-vapor system of the degreasing apparatus of the present invention in equilibrium. The only source of external energy required to maintain this thermal balance is that which is needed to operate the compressor and the various temperature responsive means for directing the flow of the refrigerant.

It has been found in the practice of the present invention that not only are all the thermal energy requirements of the solvent-vapor system satisfied by the refrigeration system of the present invention, but that likewise all of the thermal energy provided by the refrigeration system is fully utilized. Thus, the degreasing apparatus of the present invention provides a self-contained and self-balancing unit which is both economical and extremely efficient in its use of energy.

It will be readily apparent to those skilled in the art that various modifications may be made in the details of the construction as well as the use and operation of the metal degreasing apparatus of the present invention, all of which are within the spirit and scope of the present invention as recited in the appended claims. However, it is important to note that the present invention, as described and claimed herein, requires the use of a metal degreasing solvent which boils in the range from about 97° F. to about 120° F. at normal atmospheric pressure and also requires the use of a refrigeration system operating at refrigerant temperatures of from about 140° to about 200° F. at a pressure in the range from about 207 p.s.i.g. to about 250 p.s.i.g. on delivery to the inlet of the boil chamber heating coil.

What is claimed is:

1. Metal degreasing apparatus for cleaning metal work objects first by immersion in a bath of boiling liquid solvent having a boiling point in the range from about 97° to about 120° F. and then by exposure to hot solvent vapors generated from said boiling liquid solvent bath comprising, in combination, a boil chamber constructed to contain said liquid solvent in sufficient amount to enable immersion of metal work objects therein, a rinse chamber constructed to contain a sufficient volume of said liquid solvent to provide a rinsing action on immersion of metal work objects therein and disposed in relation to said boil chamber so that overflow of said liquid solvent from said rinse chamber is directed into the liquid solvent bath contained in said boil chamber, a space overlying said boil chamber and said rinse chamber for containing hot solvent vapors generated through boiling of the liquid solvent contained in said boil chamber, a separate cooling chamber in lateral open communication with the upper level of said hot solvent vapors for condensing said solvent vapors to liquid condensate, means for delivering said liquid condensate to said rinse chamber, a refrigeration system including a refrigerant, a high pressure compressor, condenser coils, and evaporator coils, said condenser coils being totally immersed in the liquid solvent bath contained in said boil chamber and said evaporator coils being immersed in the solvent vapors contained in said separate cooling chamber, said compressor having an operating pressure of from about 207 p.s.i.g. to about 250 p.s.i.g. and the temperature of the refrigerant delivered to said immersed condenser coils being in the range from about 140° to about 200° F., whereby the liquid solvent bath contained in the boil chamber is continuously maintained at its boiling point through heat interchange with the immersed condenser coils and whereby the solvent vapor generated from said continuously boiling solvent bath are continuously condensed to liquid solvent by the cooling action of the evaporator coils immersed in the solvent vapors contained in the separate cooling chamber and wherein said apparatus further includes ultrasonic transducer means immersed in the solvent contained in said rinse chamber and a heat exchanger operably associated with said refrigeration system through which solvent from said rinse chamber is circulated to maintain the solvent in said rinse chamber at a predetermined optimum temperature for operation of said ultrasonic transducers, and means responsive to the temperature of the solvent in said rinse chamber for selectively delivering to said heat exchanger a portion of the hot refrigerant from said condenser or a portion of the cold refrigerant from said evaporator.

2. The metal degreasing apparatus of claim 1 wherein said apparatus further includes a jacket affixed to the walls of said apparatus at an elevation corresponding to the lower end of the lateral communication to said cooling chamber and means for circulating a portion of said cool refrigerant from said cooling coils through said jacket.

3. The metal degreasing apparatus of claim 2 and wherein means are provided placing said cooling coils, said jacket and said heat exchanger in series with repsect to flow of said refrigerant.

4. The metal degreasing apparatus of claim 3 wherein said apparatus further includes means to bypass said heat exchanger in the flow of the refrigerant from said cooling coils.

5. The metal degreasing apparatus of claim 1 wherein said apparatus further includes means to selectively deliver hot refrigerant from the compressor to the heat exchanger.

* * * * *